United States Patent [19]

Koiso et al.

[11] Patent Number: 5,588,304
[45] Date of Patent: Dec. 31, 1996

[54] TRIGGER FOR REGENERATIVE SUBSTANCES AND REGENERATIVE BODY WITH THE TRIGGER

[75] Inventors: Yasuhiko Koiso; Yoshiki Matsumoto; Masayuki Fujisawa; Isao Nagatsu, all of Tokyo, Japan

[73] Assignee: Japan Pionics Co., Ltd., Tokyo, Japan

[21] Appl. No.: 527,501

[22] Filed: Sep. 13, 1995

Related U.S. Application Data

[63] Continuation of Ser. No. 267,391, Jun. 29, 1994, abandoned.

[30] Foreign Application Priority Data

Jun. 30, 1993 [JP] Japan ................................ 5-183486
Sep. 22, 1993 [JP] Japan ................................ 5-259261

[51] Int. Cl.⁶ ............................................. F25C 1/00
[52] U.S. Cl. ............................................. 62/340
[58] Field of Search .............................. 236/48 R, 101 E; 62/340, 853; 116/101, 216, 217

[56] References Cited

U.S. PATENT DOCUMENTS

| | | | |
|---|---|---|---|
| 3,093,308 | 6/1963 | Snelling | 236/1 |
| 4,059,970 | 11/1977 | Loeb | 62/353 |
| 4,062,201 | 12/1977 | Schumacher et al. | 62/353 |
| 4,261,182 | 4/1981 | Elliott | 62/353 |
| 4,426,307 | 1/1984 | Wada et al. | 252/70 |

FOREIGN PATENT DOCUMENTS

| | | |
|---|---|---|
| 0151352 | 8/1985 | European Pat. Off. . |
| 58-99696 | 6/1983 | Japan . |
| 61-197921 | 9/1986 | Japan . |
| 3-25538 | 3/1991 | Japan . |

OTHER PUBLICATIONS

European Search Report dated Feb. 22, 1995.

*Primary Examiner*—William E. Tapolcai
*Attorney, Agent, or Firm*—Staas & Halsey

[57] ABSTRACT

A trigger capable of causing crystallization of regenerative substances. A regenerative body includes the trigger which includes a plurality of secured elastic flat elements and the regenerative substances, when in a supercooled state, receive a physical stimulus from the trigger.

20 Claims, 3 Drawing Sheets

TRIGGER FOR REGENERATIVE SUBSTANCES AND REGENERATIVE BODY WITH THE TRIGGER

This application is a continuation of application Ser. No. 08/267,391, filed Jun. 29, 1994, now abandoned.

BACKGROUND OF THE INVENTION

1. Field of the Invention

The present invention relates to a trigger for regenerative substances, and particularly relates to a trigger for regenerative substances which causes liquid regenerative substances in a supercooled state to begin crystallization.

2. Description of the Prior Art

As a regenerative substance, a substance such as 3-hydrates of sodium acetate has been conventionally used, taking advantage of its character to absorb or radiate a latent heat, due to phase changes between freezing and melting. After such a regenerative substance melts by heat and when it is cooled down to its freezing point, it begins crystallizing and simultaneously radiating a latent heat, and enters into a state of heat generation. However, the regenerative substance sometimes does not crystallize and reaches a supercooled state even if it is cooled down to its freezing point or a lower temperature.

As an example method for preventing such a supercooled state of the above-described regenerative substance, it is known that a crystalline nucleus forming material may be previously added to the regenerative substance, as disclosed in the official gazette of Japanese Patent Laid-Open (Kokai) Publication No. SHO 58-99696.

According to this conventional example, the addition of a crystalline nucleus forming material to a regenerative substance may prevent the regenerative substance from reaching a supercooled state. Thus, when the regenerative substance is cooled down to its freezing point, it begins to crystallize and radiate a latent heat.

In this case, however, the fact that the regenerative substance always has to be kept in a melting state at the melting point or higher temperatures is problematic.

At the same time, it is possible to intentionally maintain the supercooled state of the regenerative substance by not adding a crystalline nucleus forming material to the regenerative substance (thus preventing the regenerative substance from crystallizing even if the temperature lowers). By using this technology, we may apply a physical stimulus to the regenerative substance whenever necessary, and cause it to begin crystallization, to terminate the supercooled state, and to generate heat. As a means of attaining this purpose, a regenerative body in combination with a trigger is known, which is capable of applying a physical stimulus whenever necessary, and of keeping the regenerative substance in a supercooled state.

By using this trigger combined with a regenerative body, the supercooled state can be intentionally maintained even if the temperature lowers. Therefore, it is possible to cause the trigger to start functioning at any time to begin heat generation. Making use of this characteristic, it is possible to make a portable heat generating body by using the regenerative substance.

Examples of triggers for regenerative substances which have been suggested are: a trigger having a sharp metal tip which is intended to contact with the regenerative substance in a supercooled state to apply a physical stimulus, as disclosed in the official gazette of Japanese Patent Laid-Open (Kokai) Publication No. SHO 61-197921; and a trigger having a coil spring which is intended to contact with the regenerative substance in a supercooled state, in order to apply a physical stimulus to the regenerative substance when the regenerative substance is deformed by a force imposed from outside, as disclosed in the official gazette of Japanese Utility Model Laid-Open (Kokai) Publication No. HEI 3-25538.

However, the trigger for regenerative substances disclosed in the official gazette of Japanese Patent Laid-Open (Kokai) Publication No. SHO 61-197921 has a complicated construction by which to generate the physical stimulus. Other problems include the fact that the crystallization of the regenerative substance will not begin if the operation of the trigger is insufficient, and that the crystallization of the regenerative substance might accidentally begin if the trigger is mistakenly activated.

On the other hand, the trigger disclosed in the official gazette of Japanese Utility Model Laid-Open (Kokai) Publication No. HEI 3-25538 is problematic in that its construction is complicated, and in that it is therefore difficult to manufacture. Moreover, when transporting a regenerative body having this kind of trigger, vibrations or shocks occurring when it is being carried may cause the trigger to apply the physical stimulus to the regenerative substance. Accordingly, by the time the regenerative body is actually used, the generation of heat will have been depleted. This will impair the reliability of the regenerative body.

The present invention is intended to solve the above-mentioned problems which have arisen. The objective of this invention is to provide a trigger for regenerative substances which does not abruptly go into action due to forces arising out of shocks or vibrations during transportation, and to provide a trigger for regenerative substances which, when used, is capable of causing the regenerative substances to crystallize and to radiate a latent heat generated during the freezing process of the regenerative substances with absolute certainty. Another objective of this invention is to provide a reliable regenerative body which has such a trigger for regenerative substances.

SUMMARY OF THE INVENTION

In order to attain the above-mentioned objectives, the present invention provides a trigger for regenerative substances which terminates the supercooled state of the regenerative substances. The trigger for the regenerative substances has a stimulating means which applies a physical stimulus to the regenerative substances whenever necessary to terminate the supercooled state of the regenerative substances (when intended to cause the regenerative substances to freeze and radiate latent heat). Otherwise, the stimulating means does not apply any physical stimulus to the regenerative substances.

This invention provides a trigger for regenerative substances which is characterized in that the above-described stimulating means has a stimulator in which a plurality of elastic elements is placed in a manner such that the entire surface of each of these elastic elements may be in contact with the others.

Moreover, this invention provides a trigger for regenerative substances which is characterized in that the stimulating means has a stimulator which generates the physical stimulus, and a coating element (layer) which coats the insulator.

Furthermore, this invention provides a trigger for regenerative substances which is characterized in that the stimulating means has a securing means to secure the plural elastic elements to each other.

The plural elastic elements may have a construction in which each of the elastic elements is placed with its entire surface in contact with the other elastic elements. The elastic elements may have another construction in which there is some space between each of the elastic elements (the average of the space being 0.1 mm to 5.0 mm). The elastic elements should preferably be flat, and 0.1 mm to 4.0 mm thick. Also, the flat element should preferably include any one of carbon steel, stainless steel, phosphor bronze, white metal, brass, and beryllium copper. Furthermore, the flat element should preferably be composed of: a metal including any one of carbon steel, stainless steel, phosphor bronze, white metal, brass, and beryllium copper; and another metal which is different from the coating metal and is coated by the coating metal.

The stimulator should preferably have an elastic limit of 20 kgf/mm$^2$ to 160 Kgf/mm$^2$, a modulus of longitudinal elasticity of 7500 Kgf/mm$^2$ to 22,000 Kgf/mm$^2$, and a modulus of transverse elasticity of 3,500 Kgf/mm$^2$ to 9,000 Kgf/mm$^2$.

The securing means should preferably include any one of a vise, an eyelet, and a caulking.

The coating element should preferably have: a density of 0.005 g/cm$^3$ to 0.30 g/cm$^3$; a void ratio of 70% to 99.5%; and a compressive strength under 40% compression of 5 g/cm$^2$ to 300 g/cm$^2$. The coating element should preferably include a foam material which is either synthetic resin, synthetic rubber, or natural rubber.

This invention provides a regenerative body which is characterized in that it has: a trigger for regenerative substances having a stimulator which is constructed by placing a plurality of elastic elements in a manner such that the entire surface of each of these elastic elements may be in contact with each other, and which applies a physical stimulus to the regenerative substances when such physical stimulus is necessary to terminate the supercooled state of the regenerative substances; and regenerative substances which are in a supercooled state, which receive a physical stimulus from the trigger.

This invention also provides a regenerative body which is characterized in that it has: regenerative substances; a trigger for regenerative substances having a stimulator which is constructed by placing a plurality of elastic elements in a manner such that the entire surface of each of the elastic elements may be in contact with each other, and which applies a physical stimulus to the regenerative substances when such physical stimulus is necessary to terminate the supercooled state of the regenerative substances; and a package to hold the regenerative substances and the trigger for the regenerative substances.

This invention further provides a regenerative body which is characterized in that it has: regenerative substances; a trigger having a stimulator to apply a physical stimulus to the regenerative substances in order to terminate the supercooled state of the regenerative substances, and a coating element to coat the stimulator; and a package to hold the regenerative substances and the trigger for the regenerative substances.

This invention also provides a regenerative body which is characterized in that it has: regenerative substances; a trigger for regenerative substances which is constructed in a manner such that a plurality of elastic elements is placed with their entire surfaces in contact with the other elastic elements, and, that the plural elastic elements are held by a securing means; and a package to hold the regenerative substances and the trigger for the regenerative substances.

This invention also provides a regenerative body having a stimulator which is constructed in a manner such that the plural elastic elements are placed with their entire surfaces in contact with the other elastic elements.

Finally, this invention provides a regenerative body having a stimulator which is constructed in a manner such that there is some space between the plural elastic elements (the average of the space being 0.1 mm to 5.0 mm).

DESCRIPTIONS OF THE DRAWINGS

DETAILED DESCRIPTION OF THE PREFERRED EMBODIMENTS

Figure 1:
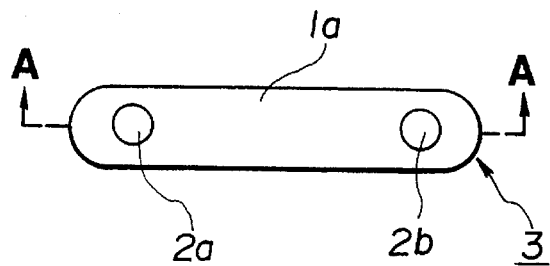
FIG. 1 is a plan view of the trigger for the regenerative substances of one example of the present invention.

The trigger for the regenerative substances of the present invention does not deform or apply a physical stimulus to the regenerative substances when it is not used, notwithstanding any shocks or vibrations occurring when the regenerative body is transported or when it is just being carried.

When using the regenerative body, the trigger of this invention generates the necessary physical stimulus and applies it to the regenerative substances to terminate the supercooled state of the regenerative substances. "To terminate the supercooled state" may be restated as "to break the supercooled state."

Since the trigger for regenerative substances of this invention is constructed in the above-described manner, it is not activated by mistake. When using the regenerative substances, the trigger is capable of being activated with certainty, causing the regenerative substances to begin crystallization.

A preferable embodiment of the trigger of this invention can be realized by providing a stimulating means composed of a plurality of elements with predetermined elasticity and rigidity, placed with their entire surfaces in contact with the other elastic elements. When using the regenerative body, a required flow stress is applied to the stimulator, thereby causing the plural elements to come into contact with each other over their entire surfaces. At that time, the stimulator generates a physical stimulus by using the friction which occurs between the elements, and applies the physical stimulus to the regenerative substances.

If an abrupt stress such as a shock or vibration is applied to this trigger for the regenerative substances when it is not being used, the trigger is capable of receiving the stress on the surface of the stimulator. Therefore, when an abrupt stress, smaller than the flow stress occurring during the use of the regenerative body, is applied to the trigger, the plural elements are usually inhibited from being in contact with each other over their entire surfaces.

In order to generate the physical stimulus through contact of the elements over their entire surfaces, the plural elements should previously be placed either with their entire surfaces being in contact with each other, or with a comparatively narrow space between each of the elements facing each other.

In the latter case, the plural elements deform elastically, and the required physical stimulus is obtained when each of the plural elements comes into contact with the other plural elements over its entire surface. In the former case, elastic deformation, and particularly distortion of the plural elements causes friction at the interfaces between the elements, thereby obtaining the required physical stimulus.

Space between the plural elements is appropriately determined in accordance with the characteristics of the elements (such as elasticity), with the aim of controlling the generation of the required physical stimulus to have it occur only when necessary. However, the space would normally be from 0.1 mm to 5.0 mm. The objectives of this invention can be attained by placing the elements so as to overlap one another while leaving spaces of the above-mentioned range.

As the plural elements (which form the stimulator of this invention) are secured with a securing means, this invention is capable of resisting abrupt stresses. This resistance action can be enhanced by securing the plural elements to each other at least two positions by using the securing means.

The above-described elements for generating stimulus are preferably formed in a flat shape. These flat elements distort as a result of a stress imposed from the outside, and then generate the required physical stimulus only when necessary.

The shape and size of the flat elements can be selected in accordance with the shape, area, and volume of the regenerative body. For example, a rectangle, square, circle, oval, or any other shape would be acceptable, but a rectangle is usually preferable, especially one with its longer side 1.5 to 10 times longer than its shorter side. If the area of the flat element is too great, the elements might deform elastically too easily due to shocks or vibrations when the regenerative body is held, causing the flat elements to rub against one another, resulting in the application of unnecessary physical stimulus to the regenerative body.

On the other hand, if the area of the flat element is too small, applying stress to the flat elements from the outside when the regenerative body is being used would be difficult, and the flat elements would not sufficiently deform elastically. If the flat element is rectangular, the preferable size would be 3 mm to 30 mm for the shorter side, and 10 mm to 100 mm for the longer side. The most preferable size would be 5 mm to 20 mm for the shorter side, and 15 mm to 60 mm for the longer side. However, those skilled in the art of this invention are easily able to understand that the above values will change depending on the materials used for the flat elements, the process used thereof, and the physical characteristics of the materials (e.g., their elasticity and rigidity). It should be noted that these will also apply to the numerical values indicated hereinafter.

As for the thickness of the flat elements, settling numerical values which enable the regenerative body to generate the required physical stimulus when an ordinary young person imposes comparatively large pressure on the regenerative body with his/her fingers is preferable. While the absolute value of thickness cannot be determined, as stated above, a thickness of 0.1 mm to 4.0 mm is preferable, and a thickness of 0.2 mm to 2.0 mm is most preferable. The word "distortion" used herein can be also expressed as "bend" which has a similar meaning.

It should be noted that thickness of the flat elements will need to be adjusted appropriately in accordance with the area, the width, and other factors of the flat elements.

By making pores or projections over all or part of the surface of the flat element, it is possible to change or control the characteristics of the flat elements which give effect to deformation. The pore shape could be circular, oval, rectangular, quadrilateral, or slit shaped. For example, projections may be provided by imposing force from one side of the flat element by using a sharp tool such as a gimlet.

The stimulator normally has a construction in which two flat element sheets are laid so as to overlap each other. As described above, these two flat element sheets may either be placed in close contact with each other, or separated with a predetermined space between them.

The width of the spaces may either be constant over the entire surface of each of the flat elements, or may vary within a predetermined range. The width of the spaces is selected from the following average widths measured between each point of the surfaces between the flat elements: 0.1 mm to 5.0 mm, and more preferably, 0.3 mm to 2.0 mm.

Metals are normally selected as the material of the flat elements. Examples of metals which can be selected are carbon steel, stainless steel, phosphor bronze, white metal, brass, beryllium copper, iron, Monel metal, Corson alloy, and constantan. Among these metals, stainless steel, phosphor bronze, white metal, brass, and beryllium copper are preferable in order to provide for the necessary deformation. Instead of the above-mentioned metals, other materials capable of bonding these metals to a resin surface by gilding or by evaporation may be used.

The stimulator must have the desirable range of elasticity, in order that it may generate the required physical stimulus whenever necessary. The elastic limit of the stimulator should preferably be 20 Kgf/mm$^2$ to 160 Kgf/mm$^2$, the modulus of longitudinal elasticity should preferably be 7500 Kgf/mm$^2$ to 22,000 Kgf/mm$^2$, and the modulus of transverse elasticity should preferably be 3,500 Kgf/mm$^2$ to 9,000 Kgf/mm$^2$. If the elasticity is smaller than the above-mentioned range of values, abrupt stresses could sometimes cause the trigger to be activated. On the other hand, if the elasticity is larger than the above-mentioned range of values, it might be difficult to activate the trigger with normal power applied by a person. However, the above-mentioned values may vary in accordance with the size, shape, materials, and with other factors of the elements, such that the elasticity of the stimulator is not necessarily limited to the above range of values.

As the securing means for securing the plural elements of the stimulator, vises, rivets, eyelets, caulkings, soldering, and adhesives can be used. Among these securing means, vises, rivets, eyelets, and caulkings are most preferable. In order to provide space between the elements, washers, packings and other similar materials can be inserted between the elements. Also, for the purpose of avoiding a malfunction of the trigger for regenerative substances caused by shocks or vibrations when the trigger is held, spacers made of elastic resin may be inserted between the flat elements.

The characteristics of the stimulating elements of this invention are expressed by their elasticity as described above, but their characteristics can be also expressed by their rigidity. (Toughness is one factor expressing rigidity.)

Another preferable embodiment of this invention can be realized by a construction in which the stimulator of this invention or a conventional stimulator is covered by a coating element. This coating element is provided in order to create a buffer against abrupt stresses caused by shocks or vibrations when the trigger for regenerative substances is held, and to reduce the stress to a value below the threshold value for activating of the trigger. When using the regenerative body, it is possible to cause deformation of the stimulator by applying stress, which exceeds the normally-predictable value for abrupt stresses, to the regenerative body.

The coating element should preferably have the flexibility and elasticity to absorb any shocks or vibrations caused by abrupt stresses from the outside, and the coating element should preferably have a density of 0.005 g/cm$^3$ to 0.30 g/cm$^3$. Moreover, the coating element should preferably have a void ratio of 70% to 99.5%, and a compressive strength under 40% compression of 5 g/cm$^2$ to 300 g/cm$^2$. Examples of the coating element are: nonwoven cloth or a weaved mixture of synthetic or natural fibers; synthetic resin foam; and synthetic or natural rubber foam. Out of these materials, foam materials are preferable as they have superior flexibility and elasticity, and also are superior in absorbing any shocks or vibrations. Examples of foam materials are polyurethane foam, chloroethylene foam, polystyrene foam, natural rubber sponge, and silicon rubber foam. Out of these materials, polyurethane foam is most preferable.

As a method for coating the stimulator with the coating element, for example, the coating element can be pasted over the surface of the flat element, or the entire flat element may be inserted in a bag shaped coating element which is larger than the area of the flat element, and which has an opening at least on one side. The thickness of the coating should normally be about 1 mm to 20 mm, and most preferably about 3 mm to 15 mm.

As another embodiment of the stimulator for the trigger for regenerative substances of this invention, the following materials can be used, for example: phosphor bronze (modulus of longitudinal elasticity: 10,500 Kgf/mm$^2$; modulus of transverse elasticity: 4,550 Kgf/mm$^2$; size: 10 mm×50 mm; and thickness: 0.2–1.5 mm); carbon steel (modulus of longitudinal elasticity: 21,000 Kgf/mm$^2$; modulus of transverse elasticity: 8,000 Kgf/mm$^2$; size: 10 mm×50 mm; and thickness: 0.2–1.2 mm); or stainless steel (modulus of longitudinal elasticity: 19,600 Kgf/mm$^2$; modulus of transverse elasticity: 7,700 Kgf/mm$^2$; size: 10 mm×50 mm; and thickness: 0.2–1.2 mm).

The stimulating elements should have thicknesses which allow the elastic elements to have such an elasticity and/or rigidity such that distortion may be caused by a stress applied by a human hand. If the width of the stimulating element is narrow, it may be thicker. For example, when a stimulating element made of phosphor bronze is 5 mm wide, it can be used even if it is 2.5 mm thick.

Furthermore, since the regenerative body of this invention has the trigger for regenerative substances of this invention, the stimulating element is not activated abruptly as a result of forces caused by shocks or vibrations during transportation, and the stimulating element is capable of causing the regenerative substances to crystallize with certainty and to radiate latent heat generated during the freezing process of the regenerative substances.

EXAMPLES

Preferred examples of the present invention are explained hereinafter with references to the attached drawings.

Figure 2:
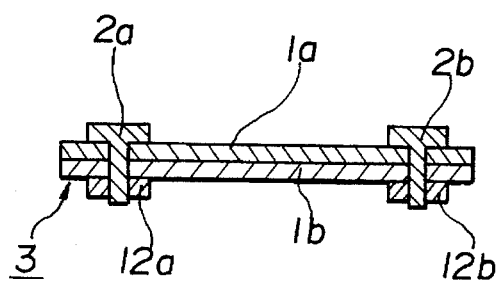
FIG. 2 is a sectional view taken on the line A—A of FIG. 1.
Figure 3:
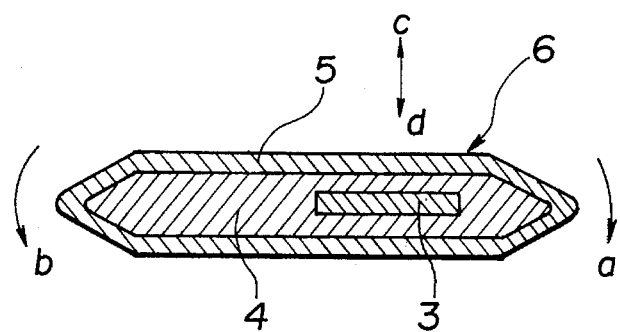
FIG. 3 is a sectional view of the regenerative body containing the trigger for the regenerative substances shown in FIG. 1.

FIG. 1 is a plan view of the trigger for regenerative substances of an example of this invention. FIG. 2 is a sectional view taken on the line A—A of FIG. 1. FIG. 3 is a sectional view of the regenerative body containing the trigger for regenerative substances shown in FIG. 1.

As shown in FIGS. 1 and 2, the trigger for regenerative substances 3 of this invention has a construction in which two sheets of long, elastic, flat elements 1a and 1b (forming a stimulator) are laid so as to be in contact with each other and overlap with one another, and in which securing means such as vises 2a and 2b pierce through the flat elements 1a and 1b at both longitudinal ends, in an angle perpendicular to the flat elements 1a and 1b, and the end portions of the vises 2a and 2b are fixed with nuts 12a and 12b.

The flat elements 1a and 1b are selected out of materials which have: an elastic limit of 20 Kgf/mm$^2$ to 160 Kgf/mm$^2$; and/or a modulus of longitudinal elasticity of 7,500 Kgf/mm$^2$ to 22,000 Kgf/mm$^2$; and/or a modulus of transverse elasticity of 3,500 Kgf/mm$^2$ to 9,000 Kgf/mm$^2$. Each of the flat elements 1a and 1b is 0.1 mm to 4.0 mm thick.

As shown in FIG. 3, the trigger for regenerative substances 3 as well as the regenerative substances 4 are contained in a sealed manner within a flat package 5.

The regenerative substances 4 are cooled down after having been completely melted by heat, and remain in a supercooled state without depositing crystals even when the temperature is lower than the respective freezing points of the regenerative substances 4. When a stress is imposed on both ends of the regenerative body 6 at the same time, such that the trigger 3 portion moves toward and is held in the middle, such that both ends bend toward the directions indicated as arrows a and b in FIG. 3, the trigger 3 distorts and friction occurs at the interface between the flat elements 1a and 1b as they move and rub against each other. This friction then becomes a physical stimulus which causes the regenerative substances 4 to begin freezing.

On the other hand, when a stress is imposed on the trigger 3 toward the directions indicated as arrows c and d, or arrows e and f, the trigger does not distort, or even if it does, the distortion is minimal. Therefore, the trigger 3 does not generate a physical stimulus even if an abrupt stress not originally intended is applied to the trigger 3 when it is being packaged, conveyed, transported or carried.

Even if the interface between the flat elements 1a and 1b become worn with time through repeated heat radiation of the regenerative body 6, new surfaces will always emerge and be in close contact with each other through being secured with the vises 2a and 2b (the securing means). Accordingly, after the heat radiation has been completed, the frozen regenerative substances 4 may be re-heated to let them melt completely, and may then be cooled down again. In other words, the regenerative body 6 can be used repeatedly.

Figure 4:
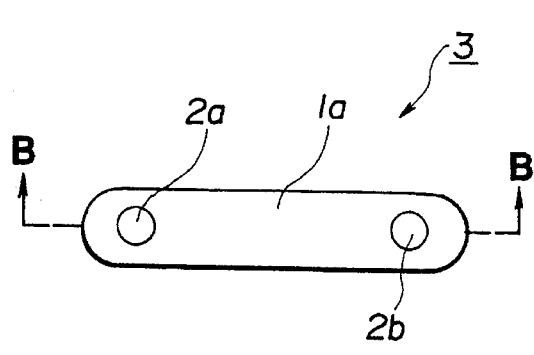
FIG. 4 is a plan view of a trigger for regenerative substances of another example of the present invention.
Figure 5:
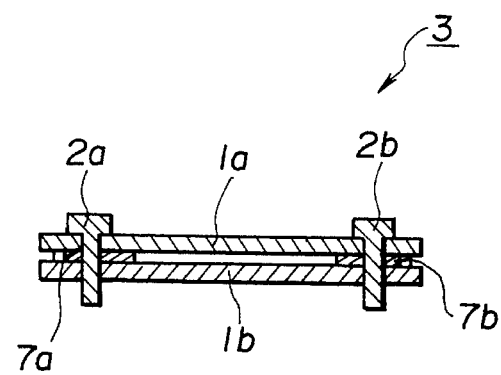
FIG. 5 is a sectional view taken on the line B—B of FIG. 4.

Another example of this invention is explained as follows:

FIG. 4 is a plan view of a trigger for regenerative substances of another example of this invention. FIG. 5 is a sectional view taken on the line B—B of FIG. 4.

The trigger for regenerative substances 3, shown in FIGS. 4 and 5, has a construction in which two sheets of long, flat elements 1a and 1b (forming a stimulator similar to that of the above-described example) are laid so as to overlap one another with washers 7a and 7b inserted between the flat elements 1a and 1b at both longitudinal ends, such flat elements 1a and 1b being secured by vises 2a and 2b (the securing means). In other words, there is a space between the flat elements 1a and 1b, corresponding to the thickness of the washers 7a and 7b. In this example, the washers, each being 0.1 mm to 5.0 mm thick, are used so that the distance between the flat elements 1a and 1b is 0.1 mm to 5.0 mm.

Since there is a space between the flat elements 1a and 1b in this example, the probability of the flat elements 1a and 1b being in contact with each other is smaller than in the above-described example. This means the resistance against abrupt stresses such as shocks or vibrations will be increased. However, as greater stress is necessary to use the regenerative body 6, the appropriate value for the required distance between the flat elements 1a and 1b must be determined by balancing the resistance against stress to the strength of the stress.

Figure 6:
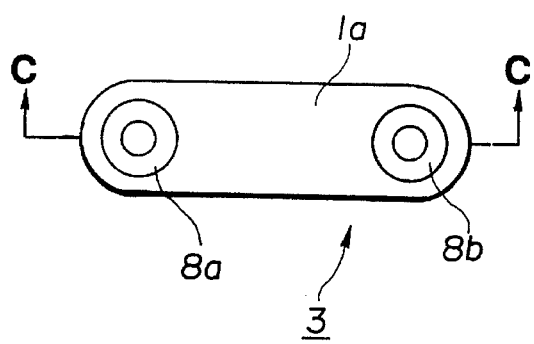
FIG. 6 is a plan view of a trigger for the regenerative substances of another example of the present invention.
Figure 7:
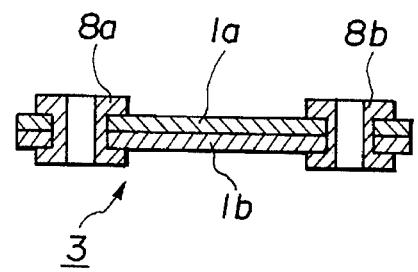
FIG. 7 is a sectional view taken on the line C—C of FIG. 6.

A further example of this invention is explained as follows:

FIG. 6 is a plan view of a trigger for regenerative substances of another example of this invention. FIG. 7 is a sectional view taken On the line C—C of FIG. 6.

The trigger for regenerative substances 3, shown in FIGS. 6 and 7, has a construction in which two sheets of long, flat elements 1a and 1b (forming a stimulator similar to that of the above-described example) are laid so as to overlap one another, and in which both longitudinal ends of the flat elements 1a and 1b are secured by eyelets 8a and 8b (the securing means). In this example, effects similar to those of the first example can be obtained.

Figure 8:
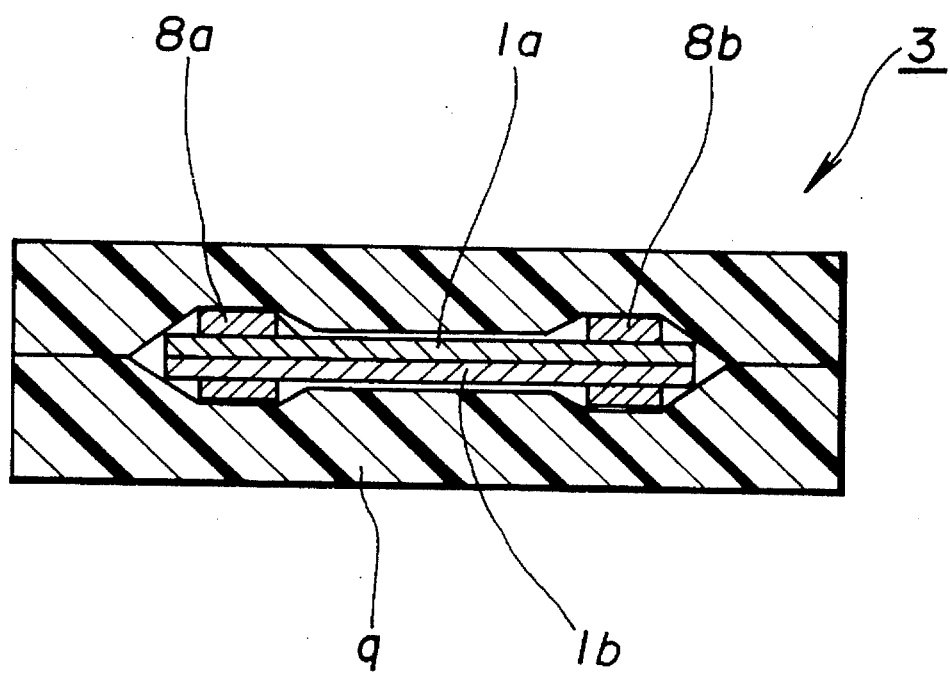
FIG. 8 is a sectional view of a trigger for the regenerative substances of another example of the present invention.

The objective of this invention can be attained by coating the trigger for regenerative substances 3 with a flexible and elastic coating element 9, as shown in FIG. 8. An abrupt stress imposed on the trigger 3 can be buffered by the coating element 9. On the other hand, the stress imposed on the regenerative body 6 during use can be effectively applied to the flat elements 1a and 1b even if the coating element 9 exists.

In the above examples, explanations are given regarding the two sheets of long, flat elements 1a and 1b used as a stimulator, and the trigger for regenerative substances 3, constructed such that these flat elements are laminated. However, without limiting the construction of the trigger to that explained above, the stimulator may only be used if it has a stimulating means which applies the physical stimulus necessary to terminate the supercooled state of the regenerative substances (causing the regenerative substances in the supercooled state to radiate the latent heat which is generated during the freezing process) to the regenerative substances. Otherwise, the stimulating means will not apply physical stimulus to the regenerative substances when necessary. Further, rigid, elastic elements capable of being in contact with each other over their entire surfaces should most preferably be used as stimulators. The elasticity of the stimulator is not limited to the aforementioned range. There are no special limitations as to the shape and size of the stimulator. For example, shapes such as squares, circles, and ovals can be selected as desired. The number of stimulators may be three or more. The regenerative body may contain a plurality of triggers.

In these examples, explanations are given regarding the case where vises 2a and 2b, and eyelets 8a and 8b are used as the securing means. However, rivets, caulkings, soldering, and adhesives may also be used as the securing means. Aside from washers, packing and other spacers can be used to form a space between the flat elements 1a and 1b.

Further, a construction in which the flat elements 1a and 1b are secured at two positions by the securing means (such as vises or eyelets) is explained in the above examples. However, the flat elements 1a and 1b may also be secured at three or more positions.

Also, the density, void ratio, and compressive strength of the coating element 9 which coats the flat elements 1a and 1b are not limited to the range mentioned above.

Examples of this invention are explained in further detail, as follows:

[EXAMPLE 1]

Flat elements 1a and 1b made of phosphor bronze were used, each being 50 mm long, 10 mm wide, and 0.3 mm thick. As shown in FIGS. 1 and 2, the flat elements 1a and 1b were laid so as to be in close contact with each other, and to overlap one another, and both their longitudinal ends were secured by vises 2a and 2b, and nuts 12a and 12b, thereby making the trigger for regenerative substances 3.

Two sheets of transparent polyethylene films, each being 120 mm long, 80 mm wide, and 100 μm thick, were placed to overlap one another. Three sides of the overlapped polyethylene films were sealed by heat, and one side remained open, thereby making a package 5 having the construction shown in FIG. 3. Then, as shown in FIG. 3, 100 g of 3-hydrates of sodium acetate as a regenerative substance 4, and the trigger for regenerative substances 3 were contained in the package 5, and the opening of the package 5 was sealed by heat to manufacture a regenerative body 6 having the construction shown in FIG. 3. After heating the regenerative body 6 up to the temperature of 85° C. and causing the 3-hydrates of sodium acetate to melt completely, the regenerative body 6 was cooled at the indoor temperature of 25° C. and its supercooled state was maintained.

Next, the resultant regenerative body 6 was made to drop onto a concrete board from a height of 1 m with the faces of the flat elements 1a and 1b perpendicular to the direction of gravity. The regenerative substance 4 did not begin generating heat.

When finger pressure was intentionally put on the regenerative body from outside the regenerative body 6 on the trigger for regenerative substances 3 (contained in the regenerative body 6), the regenerative body 6 began generating heat. While the regenerative substance 4 radiated a latent heat, maintaining its temperature at 55° C., it continued freezing.

Then, by using the same method as described above, the process of heating and melting, returning to the supercooled state, and obtaining the heat radiation as a result of the activation of the trigger for regenerative substances 3 of the regenerative body 6 were repeated 1,000 times. As a result of this test, the trigger for regenerative substances 3 was activated with certainty and heat was generated every time.

[EXAMPLE 2]

Flat elements 1a and 1b made of stainless steel were used, each being 50 mm long, 10 mm wide, and 0.3 mm thick. As shown in FIGS. 4 and 5, the flat elements 1a and 1b were laid so as to overlap one another, with washers 7a and 7b (each being about 0.8 mm thick) inserted between the flat elements 1a and 1b at their longitudinal ends. Both the longitudinal ends were secured by vises 2a and 2b (the securing means), thereby making a trigger for regenerative substances 3. In other words, the trigger for regenerative substances 3 was constructed in a manner such that there is a 0.8 mm space between the flat elements 1a and 1b.

Then a regenerative body 6 (similar to that of EXAMPLE 1) was manufactured by using the above trigger for regenerative substances 3. As a result of the dropping test (performed in the same manner as in EXAMPLE 1), the regenerative body 6 did not begin generating heat, just as it did not in EXAMPLE 1. And, as a result of the activation test of the trigger for regenerative substances 3 (performed in the same manner as in EXAMPLE 1), the same results as in EXAMPLE 1 were obtained.

[EXAMPLE 3]

Flat elements 1a and 1b made of stainless steel were used, each being 50 mm long, 10 mm wide, and 0.3 mm thick. As shown in FIGS. 6 and 7, the flat elements 1a and 1b were laid so as to be in close contact with each other, and to overlap one another, and both their longitudinal ends were secured by eyelets 8a and 8b, thereby making a trigger for regenerative substances 3.

Then the regenerative body 6 (similar to that of EXAMPLE 1) was manufactured by using the above trigger for regenerative substances 3. As a result of the tests (performed in the same manner as in EXAMPLE 1), the same results as in EXAMPLE 1 were obtained.

[EXAMPLE 4]

Two foam sheets made of polyurethane resin, each being 60 mm long, 30 mm wide, and 5 mm thick, were laid so as to overlap one another. As shown in FIG. 8, their two short sides were fixed and bonded, and their two long sides were left open, thereby making a bag-shaped coating element 9, with both flexibility and elasticity. Then, the trigger for regenerative substances 3 (obtained in EXAMPLE 1) was inserted through the opening of the coating element 9, so that the entire outside surfaces of the flat elements 1a and 1b were covered with the coating element 9, made of polyurethane resin foam sheets. By using the resulting trigger for regenerative substances 3, a regenerative body 6 (similar to that of EXAMPLE 1) was manufactured. As a result of the dropping test (performed in the same manner as in EXAMPLE 1), the same results as in EXAMPLE 1 were obtained.

[Comparative Example 1]

A regenerative body having a construction similar to that of EXAMPLE 1 was manufactured, except that instead of the triggers for regenerative substances 3 described in the above examples, a trigger for regenerative substances made of coil springs was used (wire diameter: 0.3 mm; coil diameter: 2.5 mm; length: 20 mm; number of times coil is wound: 25), the material for which is the same as the above-described flat elements 1a and 1b.

As a result of the dropping test (performed in the same manner as in EXAMPLE 1), the regenerative body immediately began generating heat.

As explained above, the trigger for regenerative substances of this invention is capable of avoiding abrupt activation caused by forces occurring due to shocks or vibrations during transportation. Moreover, when the trigger for regenerative substances 3 is used, it is capable of crystallizing the regenerative substances with certainty, and causing the regenerative substances to radiate a latent heat generated during the freezing process of the regenerative substances. Furthermore, the trigger for regenerative substances of this invention can be used many times, and is superior in performance.

The regenerative body of this invention is capable of radiating a latent heat with certainty only when it is activated by a person who using it. When it is not activated, the regenerative body is capable of keeping the regenerative substances in their supercooled state. As such, this invention provides a highly reliable regenerative body.

What is claimed is:

1. A trigger for regenerative substances which terminates the supercooled state of the regenerative substances, comprising;

a stimulating means which, when physically manipulated, applies a physical stimulus to the regenerative substances when necessary to terminate the supercooled state of said regenerative substances, causing the regenerative substances to freeze and to radiate a latent heat, and which otherwise does not apply a physical stimulus to said regenerative substances, wherein said stimulating means includes a stimulator which is formed by placing a plurality of flat elastic elements in a manner such that one side of each of these elastic elements opposes a side of another of the elastic elements, and wherein said elastic elements can move in close contact with each other in a manner which comprises a sliding frictional movement.

2. A trigger for regenerative substances which terminates the supercooled state of the regenerative substances, comprising:

a stimulating means which applies a physical stimulus to the regenerative substances when necessary to terminate the supercooled state of said regenerative substances, causing the regenerative substances to freeze and to radiate a latent heat, and which otherwise does not apply a physical stimulus to said regenerative substances, wherein said stimulating means includes a stimulator including a plurality of elastic elements which are moved in close contact with each other in a manner which comprises a sliding frictional movement which generates said physical stimulus; and a coating element which coats the outer surface of said stimulator including a plurality of elastic elements which are in sliding frictional contact with each other.

3. A trigger for regenerative substances according to claim 1, wherein said stimulator comprises a fastener which secures said plurality of elastic elements to each other.

4. A trigger for regenerative substances according to claim 1, wherein one side of each of the elastic elements is in contact with a side of another of the elastic elements.

5. A trigger for regenerative substances according to claim 1, wherein a space is formed between said elastic elements, the average of said space being 0.1 mm to 5.0 mm.

6. A trigger for regenerative substances according to claim 2, wherein each of said elastic elements is flat.

7. A trigger for regenerative substances according to claim 1, wherein said stimulator has an elastic limit of 20 kgf/mm$^2$ to 160 Kgf/mm$^2$, a modulus of longitudinal elasticity of 7500 Kgf/mm$^2$ to 22,000 Kgf/mm$^2$, and a modulus of transverse elasticity of 3,500 Kgf/mm$^2$ to 9,000 Kgf/mm$^2$.

8. A trigger for regenerative substances according to claim 1, wherein each said flat element is 0.1 mm to 4.0 mm thick.

9. A trigger for regenerative substances according to claim 1, wherein each of said flat elements is made of any one of carbon steel, stainless steel, phosphor bronze, white metal, brass, and beryllium copper.

10. A trigger for regenerative substances according to claim 1, wherein each of said flat elements includes a first metal which is any one of carbon steel, stainless steel, phosphor bronze, white metal, brass, and beryllium copper, and a second different metal which is coated by said first metal.

11. A trigger for regenerative substances according to claim 3, wherein said fastener is any one of a vise, eyelet, and caulking.

12. A trigger for regenerative substances according to claim 11, wherein said coating element has: a density of 0.005 g/cm$^3$ to 0.30 g/cm$^3$; a void ratio of 70% to 99.5%; a compressive strength under 40% compression of 5 g/cm$^2$ to 300 g/cm$^2$.

13. A trigger for regenerative substance according to claim 2, wherein said coating element is a foam material which is any one of synthetic resin, synthetic rubber, and natural rubber.

14. A regenerative body, comprising:

regenerative substances;

a trigger for regenerative substances comprising a stimulator which has a plurality of elastic elements with one side of each of these elastic elements opposing a side of another of the elastic elements, wherein said elastic elements can move in close contact with each other in a manner which comprises a sliding frictional movement, and which applies a physical stimulus to the regenerative substances when necessary to terminate the supercooled state of the regenerative substances; and a package to contain said regenerative substances and said trigger for regenerative substances.

15. A regenerative body, comprising:

regenerative substances;

a trigger for regenerative substances, comprising a stimulator having a plurality of elastic elements, wherein said elastic elements can be moved in close contact with each other in a manner which comprises a sliding frictional movement to apply a physical stimulus to said regenerative substances when necessary to terminate a supercooled state of said regenerative substances, and a coating element which coats the stimulator; and a package to contain said regenerative substances and said trigger for regenerative substances.

16. A regenerative body comprising:

regenerative substances;

a trigger for regenerative substances which is constructed by placing a plurality of elastic elements with one side of each of said elastic elements opposing a side of another of the elastic elements, and by securing said plurality of elastic elements with a fastener; and a package to contain said regenerative substances and said trigger for regenerative substances.

17. A regenerative body according to claim 14, wherein one side of each of these elements is in contact with a side of another of the elastic elements.

18. A regenerative body according to claim 14, wherein a space is formed between said plurality of elastic elements, the average of said space being 0.1 mm to 5.0 mm.

19. A trigger for regenerative substances which terminates the supercooled state of the regenerative substances, comprising:

a stimulator which applies a physical stimulus to the regenerative substances when necessary to terminate the supercooled state of said regenerative substances, causing the regenerative substances to freeze and to radiate a latent heat, and which otherwise does not apply a physical stimulus to said regenerative substances, said stimulator including a plurality of elastic elements which oppose each other and which generates said physical stimulus; and a coating element which coats the outer surface of said stimulator, wherein said coating element is selected from a synthetic resin, a synthetic rubber, and a natural rubber.

20. A trigger for regenerative substances which terminates the supercooled state of the regenerative substances, comprising:

a stimulator which applies a physical stimulus to the regenerative substances when necessary to terminate the supercooled state of said regenerative substances, causing the regenerative substances to freeze and to radiate a latent heat, and which otherwise does not apply a physical stimulus to said regenerative substances, said stimulator including a plurality of elastic elements which oppose each other and which generates said physical stimulus; and a coating element which coats the outer surface of said stimulator, wherein said coating element has a density of 0.005 g/cm$^3$ to 0.30 g/cm$^3$; and a void ratio of 70% to 99.5%; a compressive strength under 40% compression of 5 g/cm$^2$ to 300 g/cm$^2$, and wherein said coating element is selected from a synthetic resin, a synthetic rubber, and a natural rubber.

* * * * *